United States Patent [19]

Weston, Sr.

[11] 4,231,695

[45] Nov. 4, 1980

[54] CARGO LOADING AND UNLOADING APPARATUS FOR TRUCKS

[76] Inventor: Robert M. Weston, Sr., P.O. Box 812, Bayou La Batre, Ala. 36509

[21] Appl. No.: 923,515

[22] Filed: Jul. 10, 1978

[51] Int. Cl.³ .................... B60P 7/00; B61D 45/00; B20P 1/64; B63B 25/00
[52] U.S. Cl. ................ 410/69; 280/415 R; 296/39 R; 296/3; 296/35.3; 410/67; 410/79; 414/498; 277/56
[58] Field of Search .............. 105/463; 296/24, 3, 296/35 A, 39, 155.3; 280/415 R; 414/522, 498, 499, 500; 410/69, 67; 277/56, 57

[56] References Cited

U.S. PATENT DOCUMENTS

| 3,667,635 | 6/1972 | Hackney | 296/3 |
| 3,938,678 | 2/1976 | Kera | 280/415 R |

Primary Examiner—Richard A. Bertsch
Attorney, Agent, or Firm—Dowell & Dowell

[57] ABSTRACT

An apparatus including a plurality of interconnected portable pallets on which cargo is placed and which may be selectively moved into or removed from a truck body. The pallets constitute the bed or floor of the truck and may be independently or simultaneously moved into the body of the truck or removed therefrom so that portions of the contents may be loaded or discharged from different loading docks or the entire contents of the truck may be loaded or discharged from the same dock. The cargo may be loaded on the pallet or pallets prior to insertion into the body of the truck and such cargo may be unloaded from the pallets after the truck has departed so as to reduce delay in the operation of the truck.

8 Claims, 9 Drawing Figures

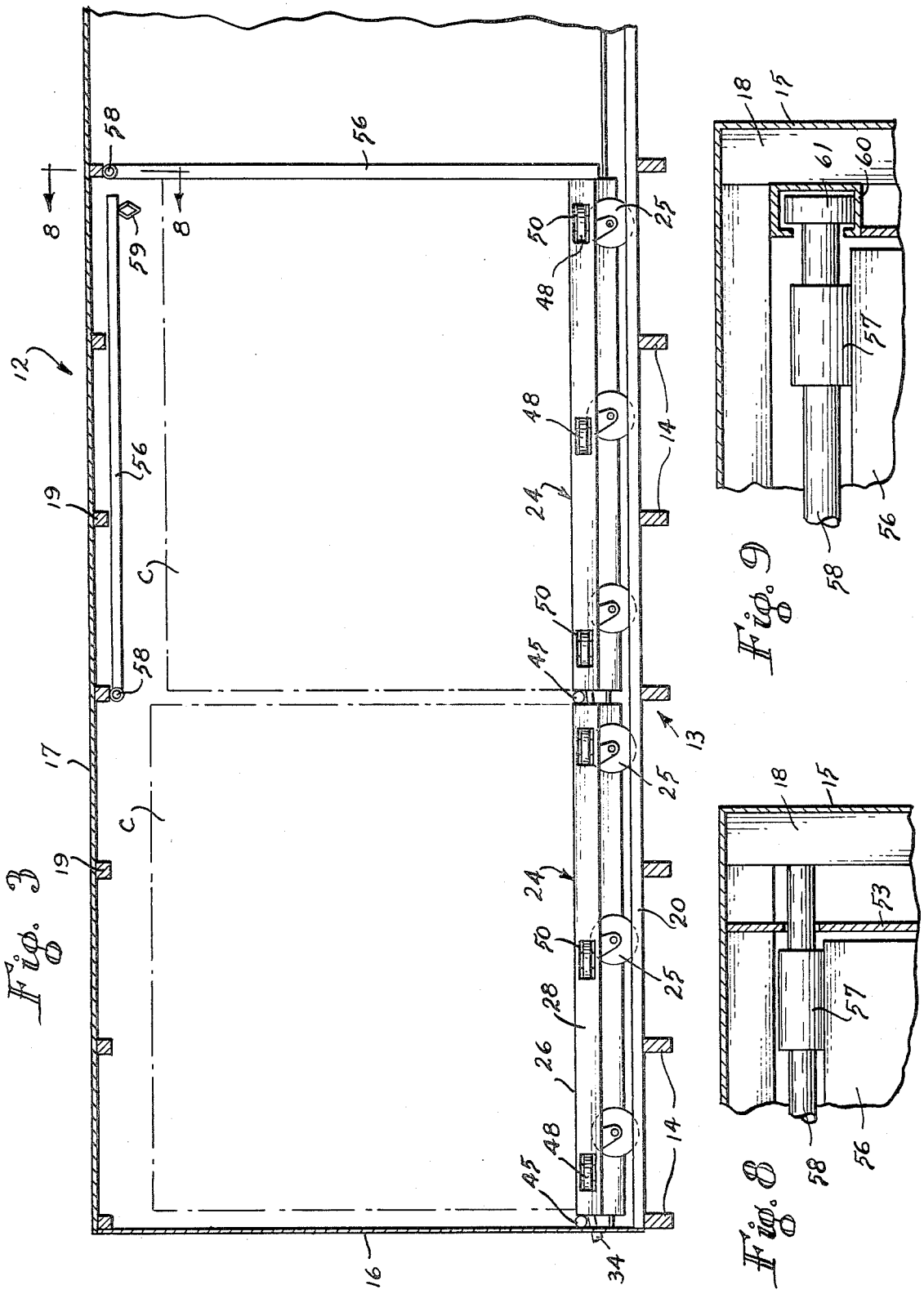

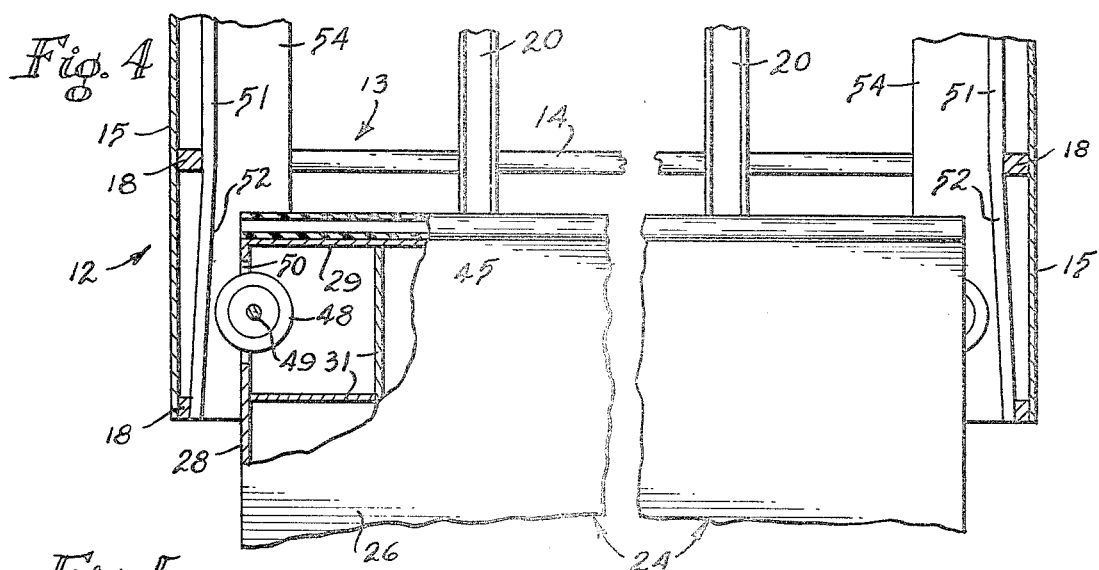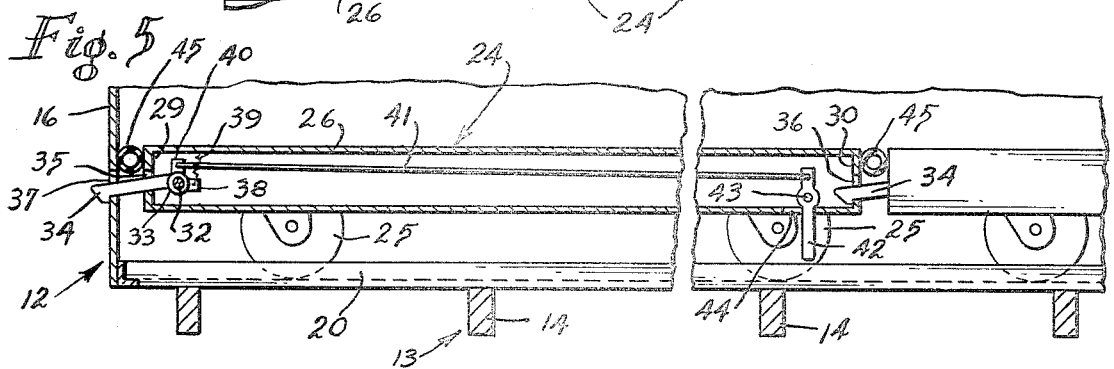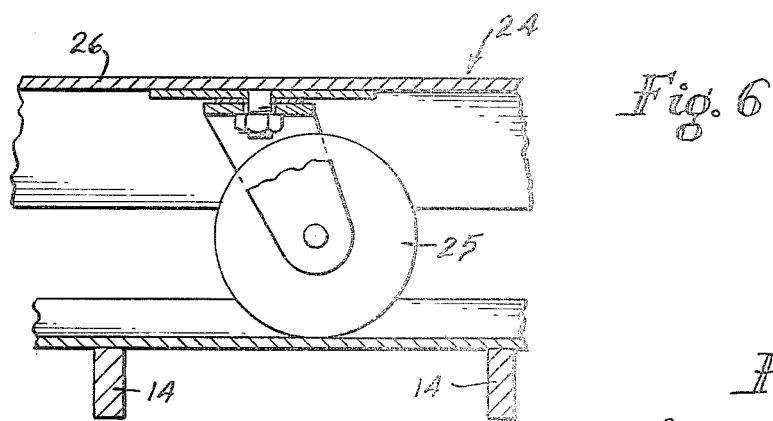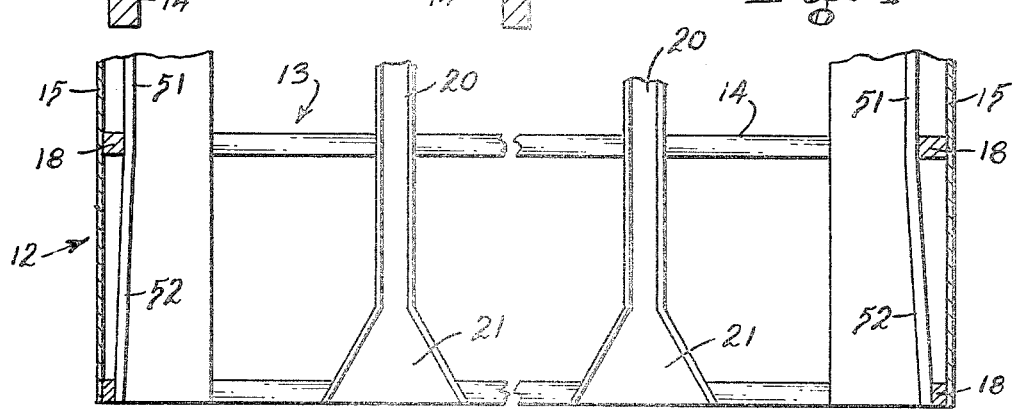

CARGO LOADING AND UNLOADING APPARATUS FOR TRUCKS

SUMMARY OF THE INVENTION

The present invention is embodied in a truck, trailer or other vehicle having a chassis or frame on which a body is mounted but which does not include a floor or bed on the chassis. The chassis is provided with a pair of longitudinally disposed guideways which receive a plurality of mobile pallets and such pallets may be interlocked with each other or may be selectively separated from each other so that all or a portion of the cargo may be introduced into or removed from the body of the truck. In this structure the pallets constitute the floor of the truck and include structure which prevents moisture and debris from being splashed or thrown onto the cargo. Normally the truck or vehicle includes one or more rear doors which protect the rear of the cargo; however, when one or more pallets have been removed from the truck, an auxiliary partition is provided to protect the cargo.

It is an object of the invention to provide an apparatus for loading and unloading cargo from a vehicle such as a truck or trailer and the like which includes a plurality of pallets each of which is provided with support wheels so that the pallets can be rolled onto and off of the chassis or frame of the truck and such pallets constitute the bed or floor of the truck when they are located within the body. Normally the pallets are interconnected with each other; however, such pallets may be selectively separated so that a portion of the cargo of the truck may be discharged at one location and the remainder of the cargo transported to another location.

Another object of the invention is to provide an apparatus for loading and unloading cargo from trucks in a minimum of down time for the truck and which includes a plurality of portable pallets mounted on wheels and arranged so that the pallets may be rolled into or from the body of a truck so that the pallets can be loaded with a predetermined quantity of cargo without the truck being present and filled pallets may be removed from the truck body so that they can be disassembled after the truck or other vehicle has left.

BRIEF DESCRIPTION OF THE DRAWINGS

FIG. 3 is a longitudinal section on the line 3—3 of FIG. 2.

FIG. 4 is an enlarged fragmentary section on the line 4—4 of FIG. 2.

FIG. 5 is an enlarged vertical section taken longitudinally of the vehicle and illustrating the means for connecting the pallets together.

FIG. 6 is an enlarged section taken longitudinally of a pallet and illustrating one of the casters thereof.

FIG. 7 is an enlarged fragmentary section illustrating the rear end of the vehicle frame.

FIG. 8 is an enlarged fragmentary section on the line 8—8 of FIG. 3.

FIG. 9 is a section similar to FIG. 8 illustrating another embodiment.

DESCRIPTION OF THE PREFERRED EMBODIMENTS

Figure 1:
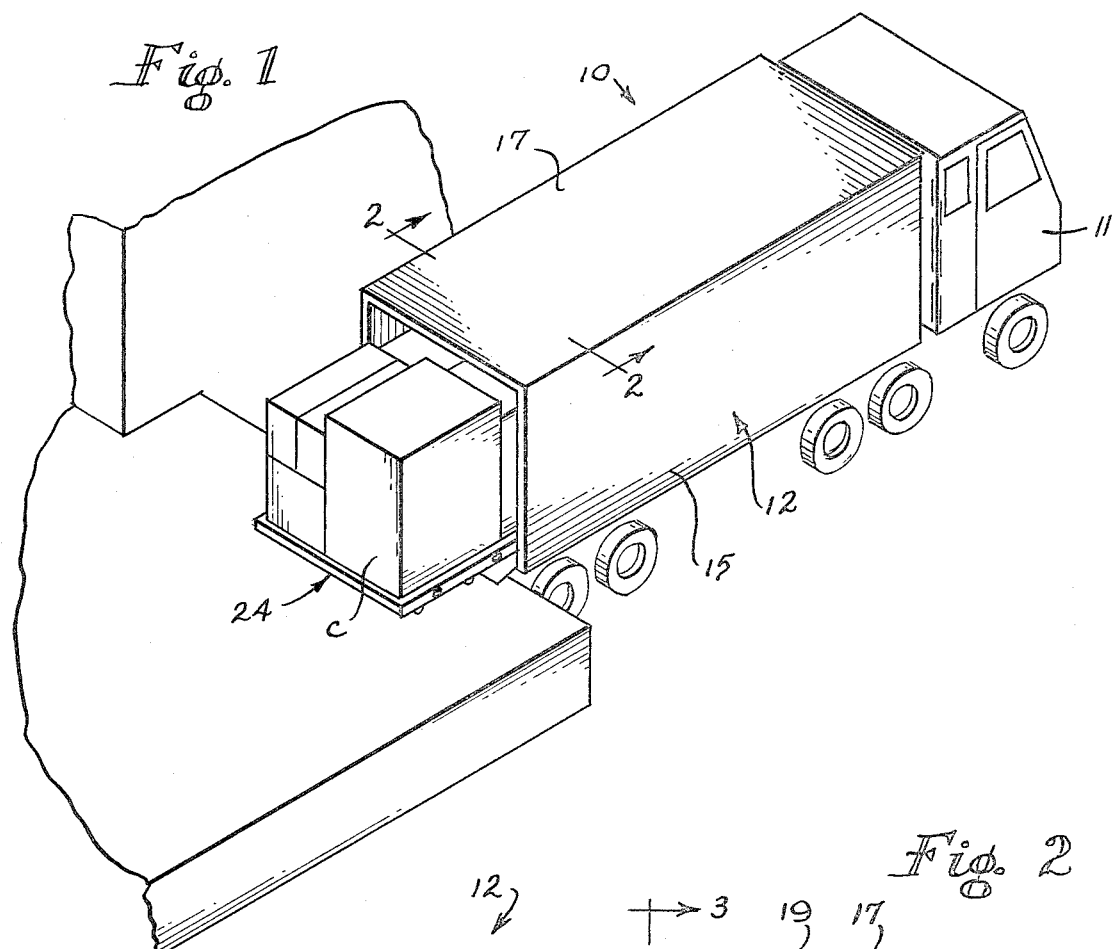
FIG. 1 is a perspective view illustrating one application of the invention.

With continued reference to the drawings, a vehicle 10 is provided including a cab or tractor 11 and a body or trailer 12. The body 12 includes a frame or chassis 13 having a plurality of spaced generally parallel cross-beams 14 extending from side to side. The body 12 includes a pair of generally parallel side walls 15, a front wall 16, and a top wall 17 with the side walls being supported by upright studs or posts 18 and the top wall being supported by braces 19. In this structure the body of the vehicle does not include a conventional floor which normally is strong enough to support the weight of the cargo being transported as well as the weight of any pallets or the like on which the cargo is stacked.

A pair of guide forming support members 20 having a generally U-shaped cross-sectional configuration are mounted on the cross-beams 14. Such members extend longitudinally of the body in spaced generally parallel relationship with each other and are secured in position with the open side uppermost. With particular reference to FIG. 7, each of the channel members 20 is provided with a flared entrance 21 for a purpose which will be described later.

A plurality of pallets 24 are provided which may be selectively moved into or removed from the body 12 of the vehicle and each of such pallets is supported by a plurality of casters or other ground-engaging wheels 25 of conventional construction. Each pallet is of generally box construction and includes a relatively strong top wall 26 connected to a bottom wall 27 by side walls 28, front wall 29, rear wall 30 and a plurality of longitudinally and laterally extending braces 31. If desired, portions of the bottom wall 27 may be omitted to accommodate the wheels 25 or such wheels may be mounted on the bottom wall 27.

The pallets 24 preferably are selectively connected together in end-to-end relationship and in order to do this the forward portion of each of the pellets is provided with a shaft 32 on which a hub 33 of a latch hook 34 is rotatably mounted. The hooks 34 extends through an opening 35 in the front wall 29 of the pallet and is adapted to be received within an opening 36 in the rear wall 30 of the next adjacent pallet, or the latch hook of the leading pallet is adapted to be received in an opening 37 in the front wall 16 of the body 12.

As illustrated best in FIG. 5, the hub 33 includes a rearwardly extending projection or boss 38 which is connected to one end of a spring 39 the opposite end of which is attached to the pallet in a manner to impart a downward movement to the latch hook 34. In order to release the latch hook from a remote position, the hub 33 also includes an upwardly extending projection or boss 40 in which one end of a rod 41 is rotatably mounted and such rod extends rearwardly through the pallet. The opposite end of the rod 41 is pivotally connected to one end of a lever 42 which is pivotally mounted intermediate its ends on a pivot pin 43 carried by the pallet. The opposite end of the lever 42 extends through an opening 44 in the bottom wall 27 and functions as a handle so that movement of the lever 42 in one direction causes the hub 33 to rotate about the shaft 32 and release the latch hook. It is noted that the lever 42 may be releasably attached to the pallet in a conventional manner to prevent the latch hook 34 from being released accidentally.

Since the body of the vehicle does not include a floor, the top walls 26 of the pallets 24 support the cargo C while the bottom walls 27 prevent water or foreign debris from contacting such cargo. In order to prevent the passage of moisture between the pallets, each of the pallets is provided with a flexible resilient tubular bumper 45 mounted on the front wall 29 and adapted to engage either the front wall 16 of the body or the rear wall 30 of the next adjacent pallet.

Figure 2:
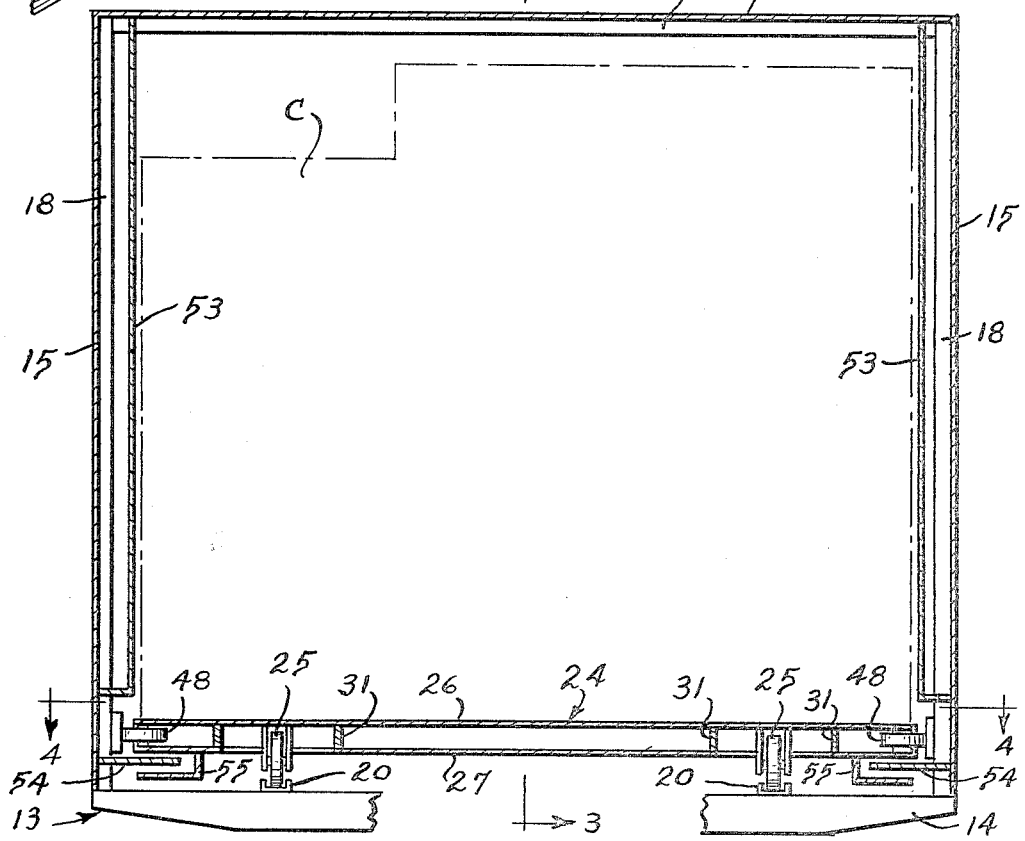
FIG. 2 is an enlarged transverse section on the line 2—2 of FIG. 1.

With particular reference to FIGS. 2, 3 and 4, each of the pallets is provided with a plurality of guide rollers 48 mounted on shafts 49 carried by the pallet and each of such rollers extends outwardly through openings 50 in the side walls 28. The lower portion of the body 12 has a track or strip of metal 51 extending longitudinally thereof and located at a height to be engaged by the rollers 48 so that such rollers are in engagement with or contiguous to the track to eliminate or substantially reduce lateral shifting of the pallets when the vehicle is moving. Preferably the track 51 includes a lead-in portion 52 adjacent to the rear of the body to cause the pallets to be aligned generally centrally of the vehicle.

The cargo C which is stacked on the pallets normally does not extend beyond a vertical plane defined by the boundaries of the top wall 26 of the pallet and in order to prevent lateral shifting of the cargo an interior wall 53 extends substantially the full length of the body 12 and in spaced relationship to each of the side walls 15. Such interior walls 53 are positioned generally along the vertical plane defined by the side walls 28 of the pallet. As illustrated best in FIG. 2, the lower edge of the interior wall 53 is located at a higher elevation than the top wall 26 of the pallets.

In order to prevent water and other foreign materials from being splashed upwardly along the sides of the pallets, the body 12 is provided with a pair of inwardly extending plates or baffles 54 extending longitudinally of the body and located below the level of the bottom wall 27 of the pallets. Each of the pallets has a downwardly and outwardly extending L-shaped skirt 55 with the outwardly extending portion being spaced in generally parallel relationship with the bottom wall 27 and underlying the inner portion of the baffles 54. The baffles normally do not engage the skirt 55 but define a serpentine path which permits air to flow but which substantially prevents water from spashing onto the cargo.

With particular reference to FIGS. 3, 8 and 9, it is possible to remove one or more of the pallets from the body so that part of the cargo carried by the vehicle may be discharged at one loading dock after which the vehicle may be driven to another location. Since the pallets constitute the floor of the body, the absence of one or more pallets leaves a large opening in the bottom of the body which is exposed to the elements. In order to protect the cargo from the elements, as well as to prevent theft when the vehicle is not moving, one or more partitions 56 are provided which are adapted to be removed into position adjacent to the cargo carried by the rearmost pallet.

As shown best in FIG. 8, each partition 56 has at least one bearing or sleeve 57 fixed to the top thereof and such bearing or sleeve is rotatably mounted on a rod 58 which is secured to the studs 18 of the body adjacent to the upper braces 19. Normally the partition is swung upwardly and secured in a conventional manner (not shown) to the top wall 17 of the body so that the pallets may be moved freely into and out of the vehicle. When one or more of the pallets have been removed from the vehicle, the partition which is mounted on the rod 58 located adjacent to the trailing end of the rearmost pallet is swung downwardly so that the lower end of such partition abuts the rear wall 30 of such pallet. Preferably the partition is connected to the trailing pallet in any desired manner, as by a spring clip 59 which passes through the opening 36 in the rear wall 30. Additionally the lower end of the partition may be locked to such pallet by any conventional locking mechanism (not shown).

In the structure illustrated in FIG. 3, a separate partition 56 is provided for each pallet so that a selected partition may be used. With particular reference to FIG. 9, it is contemplated that a movable partition may be used by providing a longitudinally extending track 60 along each side of the body adjacent to the upper braces 19 and mounting a roller 61 on each end of the rod 58 so that such rollers are located within the tracks 60. It is noted that instead of a single roller at each end of the rod 58, a dolly or truck having a housing with a pair of spaced rollers rotatably mounted therein could be provided with the ends of the rod 58 being welded or otherwise attached to the housing of such dolly or truck. In this structure the partition may be moved along the track 60 to a desired location and swung downwardly to abut the rearmost pallet regardless of the number of pallets which have been removed from the body 12.

It is noted that the pallets may be moved into and out of the body 12 in any conventional manner, as by an endless cable mounted on the body and driven by a power plant, or such pallets may be moved by an external force such as an industrial truck or by one or more workmen physically moving the pallet. Also it is contemplated that additional conventional locking mechanisms (not shown) may be provided for releasably securing the pallets to the chassis of the vehicle to prevent movement of the pallets when the vehicle is in motion.

In the operation of the device, one or more pallets 24 may be loaded with cargo at a shipping point and if two or more pallets are going to the same destination, the loaded pallets may be connected together by aligning the pallets and pushing the rearmost pallet toward the leading pallet so that the latch hook 34 of the trailing pallet enters the opening 36 in the rear wall 30 of the leading pallet. When the vehicle 10 arrives at the loading dock, a loading ramp ordinarily is positioned to bridge the gap between the chassis 13 of the vehicle and the loading dock after which the loaded pallets are moved across the dock and the ramp into the body 12 of the vehicle. As the leading pallet approaches the body, the casters 25 on the pallets pass through the flared entrance 21 and onto the channel members 20 of the body. Any misalignment of the pallet is corrected by the guide rollers 48 along the sides of the pallet engaging the tracks 51 and aligning the pallets within the body. As the pallets move into the body, the skirts 55 of each of the pallets underlie the baffles 54 to prevent water and other foreign material from splashing onto the cargo during transit. If less than a full complement of pallets is moved into the body 12 of the vehicle, a selected partition 56 is swung downwardly from a raised inoperative position to a position in which the lower end of the partition abuts the rearmost pallet and is connected thereto. Since the pallets have been preloaded, the cargo may be transferred to the vehicle in a minimum of time. If the vehicle already has cargo which is to be discharged at the loading station, the pallets within the body of the vehicle are first removed therefrom after which the pallets bearing the cargo to be shipped are moved into the vehicle. The cargo being received may be unloaded at a later time after the vehicle has departed.

I claim:

1. An apparatus for handling cargo comprising the combination of a vehicle and a plurality of mobile pallets which are selectively moved into or removed from the vehicle, said vehicle including a body having at least side wall means mounted on a chassis and being devoid of a continuous floor, at least one longitudinally extending pallet support means mounted on said chassis, baffle means carried by said side wall means and extending substantially the full length of said body, said baffle means extending inwardly from said side wall means toward said support means to a position underlying said pallets when said pallets are moved onto said support means, each of said pallets including an imperforate wall extending across said body and overlying said baffle means carried by each side wall means, and friction reducing means for supporting said pallets, whereby said pallets support the cargo within body of the vehicle and said baffle means protects the cargo within the vehicle.

2. The structure of claim 1, including skirt means located along each side of each of said pallets, a portion of each of said skirt means being in spaced underlying relationship with said baffle means.

3. The structure of claim 1 in which said support means includes a pair of substantially parallel support members each of which has a generally U-shaped cross-sectional configuration.

4. The structure of claim 1 in which each of said pallets includes a flexible bumper located along one end in a position to engage an adjacent structure.

5. The structure of claim 1, including attaching means carried by each of said pallets for releasably connecting said pallets to an adjacent structure, said attaching means including a latch hook rotatably mounted adjacent to one end of said pallet, a lever pivotally mounted adjacent to the other end of said pallet, and connected means connecting said hook to said lever, whereby said hook may be released from a remote position.

6. The structure of claim 1, including at least one partition carried by said body, means for swingably mounting said partition on said body, and means for attaching said partition to one of said pallets.

7. The structure of claim 1 in which said body includes a longitudinally extending track located adjacent to said pallets, and each of said pallets having roller means engageable with said track.

8. An apparatus for handling cargo comprising the combination of a vehicle and a plurality of mobile pallets which are selectively moved into or removed from the vehicle, said vehicle including a body having a chassis on which side, front and top walls are mounted and being devoid of a continuous floor, a pair of spaced generally parallel pallet support members mounted on said chassis and extending longitudinally the full length of said body, an inwardly extending baffle carried by each of said side walls and extending substantially the full length of said body, each of said baffles extending inwardly toward said support members, each of said pallets including an imperforate top wall having downwardly extending side, front and rear walls, each of said pallets being supported by a plurality of wheels, means for releasably attaching each of said pallets to an adjacent structure, means for selectively releasing said attaching means so that at least one pallet may be separated from the adjacent structure, and skirt means located along each side of each pallet in a position to be in overlapping relationship with said baffle when said pallet is on said support members.

* * * * *